United States Patent [19]

Kitt

[11] Patent Number: 5,191,719
[45] Date of Patent: Mar. 9, 1993

[54] DEPTH GAUGE FOR A FISHING LINE

[76] Inventor: Steve B. Kitt, 1245 26th St., Ogden, Utah 84401

[21] Appl. No.: 780,154

[22] Filed: Oct. 21, 1991

[51] Int. Cl.⁵ .................................................. G01B 3/02
[52] U.S. Cl. ........................................ 33/719; 73/300
[58] Field of Search .................. 73/300, 303, 297–299; 33/719, 717; 43/25, 4

[56] References Cited

U.S. PATENT DOCUMENTS

| | | | |
|---|---|---|---|
| 242,278 | 5/1881 | Davidson | 73/300 |
| 1,244,985 | 10/1917 | Fischer | 73/300 |
| 2,257,357 | 9/1941 | Watson | 33/717 |
| 3,466,787 | 9/1969 | Collins | |
| 4,586,286 | 5/1986 | Cheatham | 33/720 X |

FOREIGN PATENT DOCUMENTS

| | | | |
|---|---|---|---|
| 0003264 | of 1898 | United Kingdom | 73/300 |
| 26846 | of 1906 | United Kingdom | 73/300 |
| 21409 | of 1912 | United Kingdom | 73/300 |
| 627900 | 8/1949 | United Kingdom | 73/300 |

*Primary Examiner*—Harry N. Haroian
*Attorney, Agent, or Firm*—A. Ray Osburn

[57] ABSTRACT

A depth gauge for a fishing line of the manometric type, having a transparent tube plugged at one end and a valve means closing the other end, allowing a measurable amount of water into the tube and entrapping it therein, a calibrated depth scale to compare the volume of entrapped water to the related depth, and a reset means to release the entrapped water and reset the gauge. The gauge is used when fishing, trolling or casting, wherein maximum depth obtained by the gauge and other attached tackle can be determined when the gauge is retrieved from below the surface of a body of water, whether the gauge is lowered vertically or at any angle from the horizontal into the water.

6 Claims, 2 Drawing Sheets

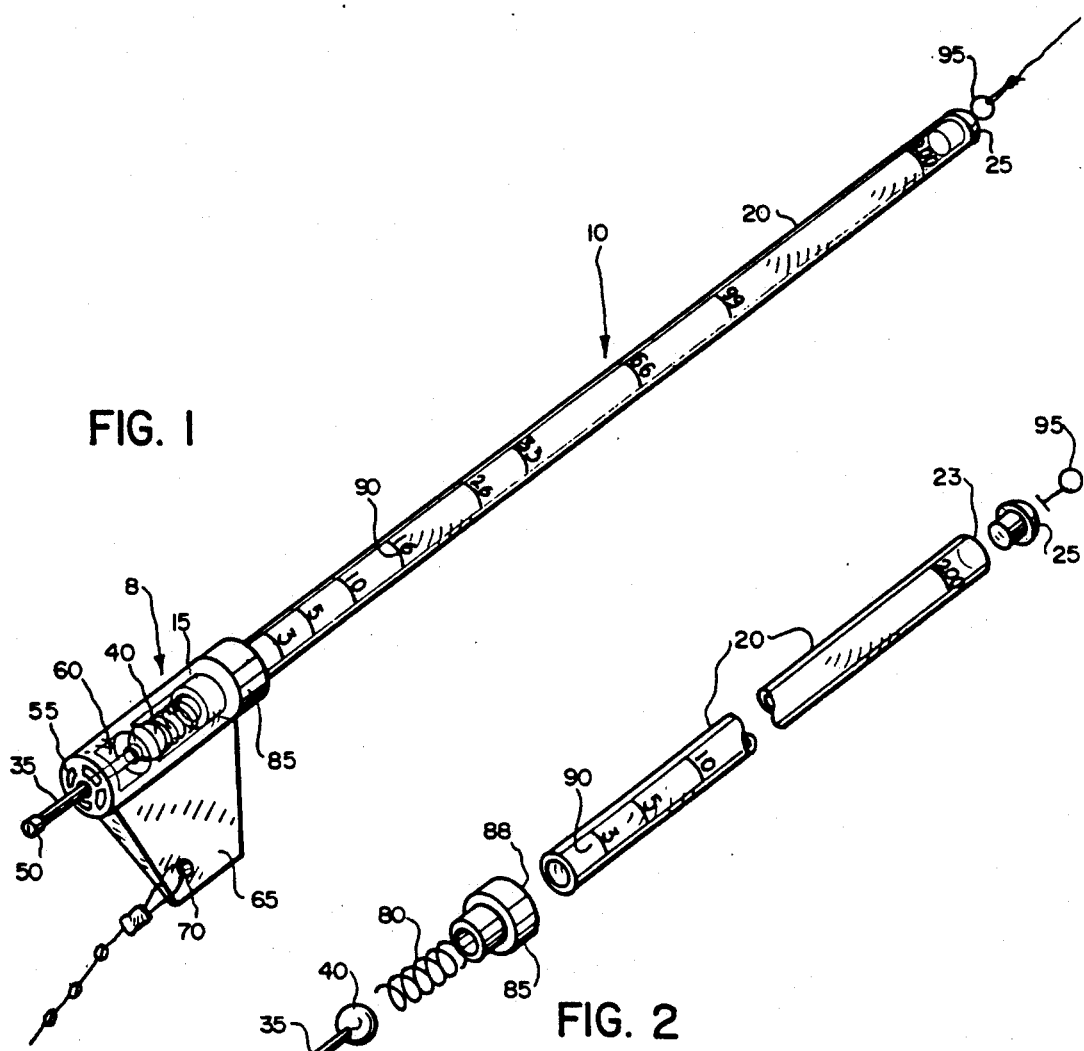
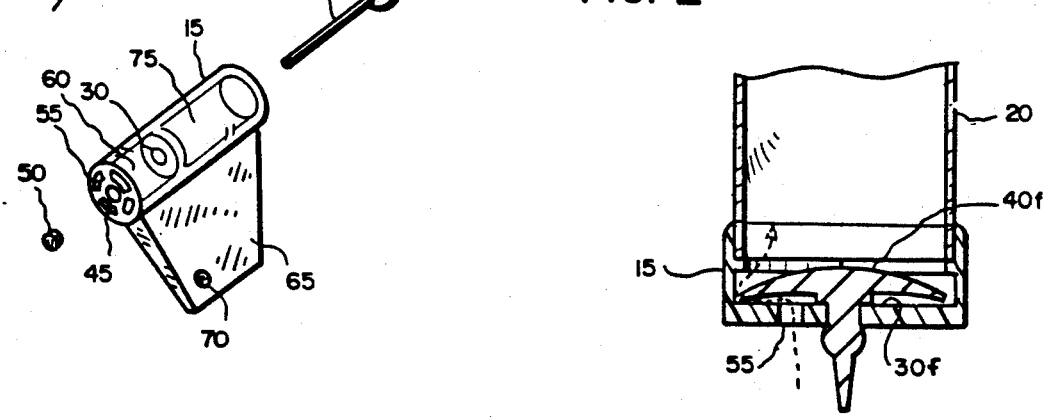

DEPTH GAUGE FOR A FISHING LINE

BACKGROUND

1. Field of Invention

This invention relates to equipment used for fishing, specifically to a gauge used to determine the depth of fishing lines, lures, and bait.

2. Description of Prior Art

It has been understood among fisherman for many years that a crucial element for success when fishing is to fish at the correct depth in the water. With the advent of devices such as electronic fish finders, the location, including the depth, of fish in a body of water can now be pinpointed precisely. The need for a means to determine the depth of the lure or bait is even more acute than before.

As a gas is compressed, its volume becomes smaller. Robert Boyle defined this relationship between pressure and volume over two centuries ago, proving that this is an inverse and proportional relationship. Water pressure increases directly in proportion to the depth of the water. The combination of these two facts has been used in the prior art as the principle for manometric type depth gauges. The simplest of these gauges would consist of a tube sealed at one end. Above the surface of the water, the open end of the tube allows the air within the tube to be at equilibrium with atmospheric pressure. If the tube is placed into water with its open end down, the air is contained in the tube. As the tube is taken deeper into the water, the increasing water pressure will force water into the tube, compressing the air. The volume of air in the tube at any particular depth is proportional to the water pressure and therefore the depth. If this tube is provided with a scale which is proportioned to compare the air or water volume inside the tube to the corresponding depth, the device becomes an effective depth gauge for water. This type of depth gauge is simple and economical, but is not practical for use by a fisherman without improvement, since the user must read the scale while the gauge is in the water and at a particular depth. Bringing the gauge back to the surface of the water, or altering its depth at all, will change the volume of air inside due to the change in water pressure. Some simple means to record the depth reading at the maximum depth achieved by the gauge is needed, such that a fisherman can read that depth after the device is removed from the water.

Other types of depth gauges, such as those used by divers, could conceivably be attached to a fishing line to determine the depth of the bait or lure. Many of these devices have a marker which records the maximum depth achieved, thus the depth could be read when the device is retrieved from the water. These gauges suffer from several disadvantages: they are complicated and expensive, making them impractical for the above purpose due to the risk of loss when fishing; they are susceptible to damage from impact; and they are not streamlined to move smoothly through water.

Another prior art device is calibrated fishing line, where increments of length along the line are marked or colored such that a fisherman may count the increments as line is fed into the water, thus determining the depth. While this provides a reliable measurement when the line is directly below the fisherman, the disadvantage to this device is that the measurement does not correspond to the correct depth when the line is at some angle other than vertical, such as when it is trolled behind a boat or cast from a shore. It also requires that a fisherman be able to count the increments, which may not be possible when the line is fed rapidly, and the fisherman can easily lose track of the count in any case.

Down-riggers, which are assemblies which lower a heavy weight on a line into the water and include a means to attach a fishing line, generally also include some means to measure the length of line fed out. Disadvantages include: they are large and heavy, requiring attachment to a boat for practical use; a fisherman must operate both the down-rigger mechanism and his fishing pole; and the line drags out at an angle away from the boat when trolling, thus making the length of line an inaccurate measure of depth.

One prior art device, described in U.S. Pat. No. 3,466,787 called a Dynamic Depressor for Fishing Line, purports to assist the fisherman in taking his line to specific depths when trolled. However, the depth this device achieves is influenced by the speed at which it is trolled and the weight of the line and tackle to which it is attached. These limitations are noted on the packaging label for the "Pink Lady," a trademark under which it is marketed. It is not intended to provide an actual measurement of the depth achieved.

A simple solution to providing a reliable depth measurement for the fisherman has thus far escaped the prior art, therefore the prior art is in need of improvement.

OBJECTS AND ADVANTAGES

It is the principal object of this invention to provide a new and improved depth gauge for fishing lines in which the maximum depth obtained by the gauge after it is lowered into the water can be determined when the gauge is retrieved from below the surface of a body of water. This allows the advantage to the fisherman to accurately know how deep his bait or lure is fished, such that he may adjust the speed of trolling, weight of tackle, or other conditions to achieve the desired depth.

It is another object of this invention to provide a device which attaches directly to the fishing line. This eliminates the need to operate a secondary device such as a down-rigger to ultimately achieve the goal of fishing at the desired depth.

It is another object of this invention to allow the attachment of other line, lures, or fishing tackle to the distal end of the gauge with respect to the fisherman.

It is another object of this invention to provide a device which is streamlined to move with minimal drag through water. Besides reducing drag which might obscure evidence of strikes by fish, this eliminates movement which might appear unnatural to a fish or cause entanglement of lines and tackle.

It is another object of this invention to provide accurate depth measurements whether the gauge is used directly below the fisherman or at any angle from the vertical. This is a clear advantage over the use of calibrated fishing line when trolling or casting.

It is another object of this invention to provide accurate depth measurements when it is dragged or trolled through water.

It is another object of this invention to provide a depth gauge for fishing which is simple in construction and economical to manufacture. This advantage is not only desirable but essential in a device attached to a fishing line, since there is some risk of losing the device when fishing.

Other objects of the invention are to provide a depth gauge which is durable in construction, with the ability to be used in combination with other accepted fishing devices without interference with these devices, and is easy and safe to use and store.

Other objects, features, and advantages of the invention will become apparent upon a study of the following specifications and accompanying drawings.

DESCRIPTION OF DRAWINGS

FIG. 1 is a perspective view of one embodiment of the fishing depth gauge.

FIG. 2 is an exploded perspective view of the device of FIG. 1.

FIG. 6 is a vertical sectional view of a fragment of an embodiment of the tube assembly of FIG. 1 having a rubberoid flapper type water inlet check valve.

LIST OF REFERENCE NUMERALS

Figure 3:
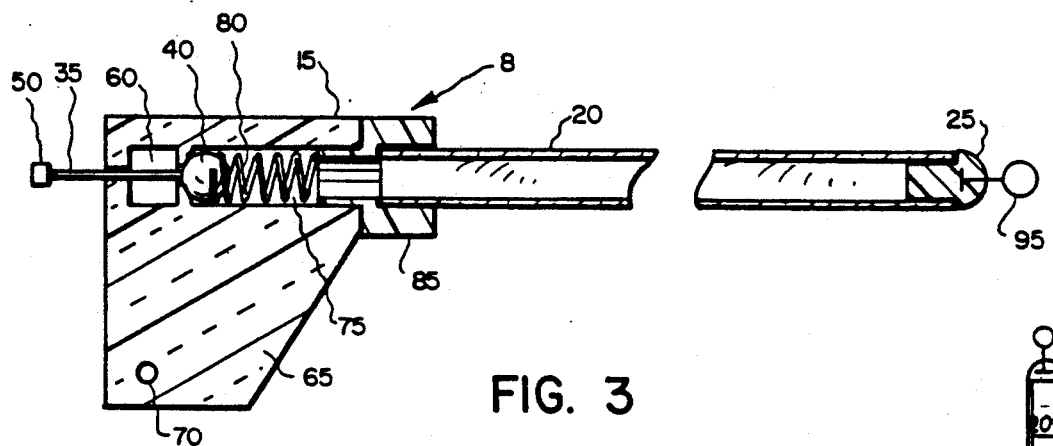
FIG. 3 is an enlarged side view of the device of FIG. 1 showing the assembled components in cross-section.

8—valve assembly
10—tube assembly
15—transparent valve housing
20—transparent tube
23—tube opening
25—plug member
30—ball seat, 30f-flapper seat
35—shaft
40—ball-ball, 40f-flapper
45—shaft guide hole
50—shaft plunger cap
55—water inlet holes
60—inner valve water pressure cavity
65—fin
70—line hole
75—ball and spring cavity
80—spring
85—spring retainer
88—opening
90—calibrated scale
95—eyelet
98—water level
100—air under pressure

DESCRIPTION OF INVENTION

FIG. 1 shows a perspective view of a basic version of my depth gauge for a fishing line, having the combination of: an elongated transparent or translucent tube 20, which has an opening extending therethrough, and having one end closed with a plug member 25 sealingly engaged therein; an eyelet 95 having the base portion embedded in the plug member 25 leaving the eyelet 95 protruding externally from the plug member 25, enabling the attachment of a fishing line to the eyelet 95; a calibrated scale 90 imprinted or otherwise formed on the surface of the transparent tube 20; a transparent valve housing 15; a ball 40; a spring 80; and a spring retainer 85. Parts 20, 25, 90 and 95 in combination are generally designated the tube assembly 10. Parts 15, 40, 80 and 85 in combination are generally designated the valve assembly 8. The end of the depth gauge where eyelet 95 attaches to the fishing line is intended to be closest to the fisherman and is hereinafter referred to as the proximal end of the gauge. The end of the gauge which comprises the valve housing 15 is hereinafter referred to as the distal end. The words proximal and distal used in connection with individual parts refers to this same alignment.

As shown in FIG. 2 and FIG. 3, the distal end of the plug member 25 has an outside diameter approximately equal to the diameter of the tube opening 23, for slidable engagement therein and is sealingly engaged and secured by adhesive means. The plug member 25 is formed in manufacture of suitable plastic, with the base portion of the eyelet 95 embedded in it such that the eyelet protrudes therefrom. The spring retainer 85 has an opening 88 which has a diameter approximately equal to the outside diameter of the tube 20, for slidable engagement therein and is sealingly engaged and secured by adhesive means. The distal end of the spring retainer 85 has a diameter approximately equal to the ball and spring cavity 75, for slidable engagement therein and is sealingly engaged and secured by adhesive means. The valve housing 15 is formed in manufacture of a suitable plastic. It includes a shaft guide hole 45, centrally located at the distal end and penetrating through to the inner valve water pressure cavity 60; water inlet holes 55 which encircle the shaft guide hole 45 and also communicate with the inner valve water pressure cavity 60; a ball and spring cavity 75; a ball seat 30 located between the inner valve water pressure cavity 60 and the ball and spring cavity 75; a fin 65; and a line hole 70. The ball 40 and the shaft 35 are combined in manufacture as one part. The shaft 35 is inserted into the ball and spring cavity 75 and then through the shaft guide hole 45 to the exterior of the valve housing 15, being stopped the desired distance from the shaft guide hole 45 when the ball 40 makes sealing contact with the ball seat 30. A rubber shaft plunger cap 50, having a hole centrally disposed partially therein with a diameter smaller than the outside diameter of the shaft end, is forced on the end of the shaft 35 creating a tight fit. A spring 80 is inserted into the ball and spring cavity 75, making contact with the ball 40. The spring 80 is of a length and compressibility such that when the spring retainer 85 is secured in the ball and spring cavity 75, the spring 80 holds the ball sealingly against the ball seat 30, but requires only the force applied to the ball 40 by an external pressure increase of 0.5 lbs/square inch to push the ball 40 away from the ball seat 30.

OPERATION OF INVENTION

Figure 4:
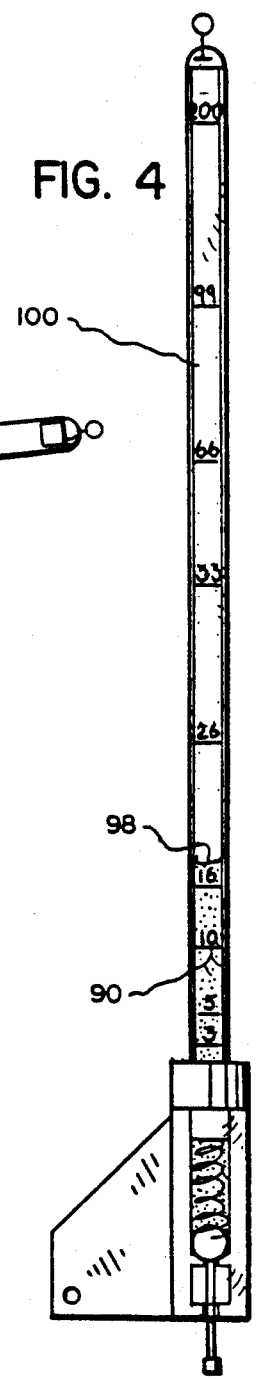
FIG. 4 is a right side view of the device in FIG. 1 showing the device containing air and water under pressure in an upright vertical position as it is held when the water level in the transparent tube is compared to the calibrated depth scale printed on the outer surface of the tube.

The depth gauge is attached to the fishing line at the eyelet 95, and bait or lure is attached to the gauge at line hole 70. The internal air pressure is then equilibrated to atmospheric pressure by momentarily pressing on the shaft plunger cap 50, which pushes the ball 40 away from the ball seat 30 and allows air to enter or exit the tube assembly 10. The depth gauge and fishing tackle is then lowered into the water. As the depth gauge sinks deeper into the water, the pressure of the surrounding water increases. This increased water pressure forces the ball 40 away from the ball seat 30, and water enters the tube assembly 10, compressing the air inside the tube assembly 10. When the depth gauge stops sinking, the external water pressure will continue to force water into the tube assembly 10 until the internal pressure is equal to the external water pressure. The valve then closes due to the tension of spring 80. There will be a volume of water thus entrapped within the tube assembly 10. This water remains entrapped as the depth gauge is raised from the maximum depth, due not only to the spring tension but also to the internal pressure forcing the ball 40 against the ball seat 30 as the external pressure decreases. The volume of water entrapped in the tube is proportional to the water pressure at the maximum depth from which the depth gauge was retrieved, consistent with Boyle's Law. The depth gauge is removed from the water and held vertically with eyelet 95 up. The water level 98 is then compared to the calibrated scale 90 to determine the maximum depth reached by the depth gauge, as shown in FIG. 4 After the reading is taken, the depth gauge is reset for a new measurement by pressing on the shaft plunger cap 50 and allowing the water to escape and the air pressure within the tube assembly 10 to equilibrate to atmospheric pressure.

SUMMARY, RAMIFICATIONS, AND SCOPE

Accordingly, the reader will see that the depth gauge for a fishing line can be used to accurately determine the depth of fishing lines, lures and bait, and that the fisherman may then use this information to adjust conditions to achieve the desired depth. Furthermore it can be seen that the device can be simply used by attachment directly to the fishing line, that it can be used in conjunction with other fishing tackle without interference, and that it is durable and economical. The unique combination described in the claims which follow has been overlooked by the prior art, and provides the surprising new result of recording or retaining the maximum depth obtained by the gauge by simply trapping the water which enters it due to the water pressure at that depth.

Figure 5:
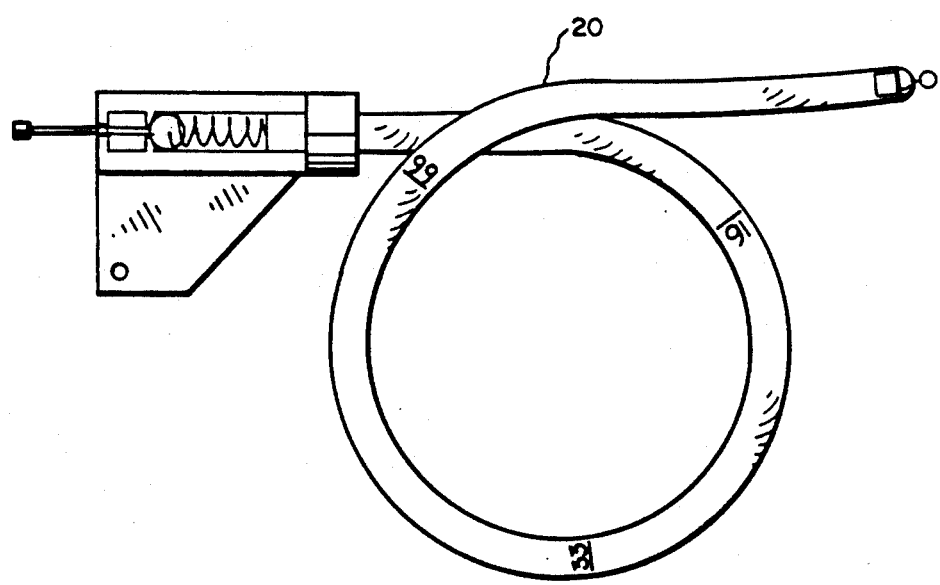
FIG. 5 is a right side view of another embodiment of the invention showing a longer tube which is flexible and coiled.

Although the description above contains many specificities, these should not be construed as limiting the scope of the invention, but as merely illustrating one of the presently preferred embodiments of the invention. Examples of other embodiments include those where:

the tube is translucent rather than transparent, or is flexible to provide more convenient storage (FIG. 5), or is longer to provide greater range or more precision, or is tapered or conical rather than cylindrical, such that the calibrated scale is linear with respect to depth, or such that the precision of a certain range of depths may be emphasized;

the valve means is another type of check valve such as a state-of-the-art rubber flap valve or the like, with a flapper 40f acting against a seat 30f as seen in FIG. 6, rather than a ball valve, or the valve-surface is enlarged to provide more sensitive response to increased water pressure;

the tube and/or valve can be dissassembled for cleaning;

the water inlet includes a filter or screen to prevent debris from entering the valve or tube;

some overpressure release means is provided to release excessive pressure if the depth gauge is lowered beyond the depth which pressure it can contain when retrieved to the surface;

the attachment means is molded or cast directly into the tube rather than being attached as a separate part; or, the density of materials or total internal volume is adjusted to control buoyancy or attitude of the gauge.

Thus the scope of the invention should be determined by the appended claims and their legal equivalents, rather than by the examples given.

I claim:

1. A method of submerging baits and lures at desired depths in a body of water for trolling for fish, wherein a fishing line is towed extending rearwardly from a towing vessel, comprising the steps;

providing a fishing line having an elongate water depth gauge secured at an end thereof selectively carrying baits and lures;

towing the line through the body of water;

withdrawing the line from the water to determine the depth of submersion of the baits and lures by reading of the gauge;

adjusting one or more conditions known to effect the depth of submersion, selected from among a group of conditions including the speed of the vessel and the weight of the baits and lures, and trolling the line, bait and lure, and gauge again through the water;

repeating the trolling, withdrawing, gauge reading and adjusting steps until the desired depth of submersion is indicated by the gauge; wherein the water depth gauge comprises an elongate light transmitting tube, having an opening extending longitudinally therethrough and having one end closed;

valve means allowing water to enter the open end of the tube when the external water pressure exceeds the pressure therewithin, and preventing the escape of air and water therefrom when the internal pressure exceeds the external pressure;

scale means carried by the tube, indicating the depth of submersion in accordance with Boyle's Law;

reset means for releasing the water and pressure contained in the tube; and attachment means for securing the gauge to the lure and bait end of the fishing line.

2. A method of submerging baits and lures at desired depths in a body of water for trolling for fish, wherein a fishing line is towed extending rearwardly from a towing vessel, comprising the steps;

providing a fishing line having an elongate water depth gauge secured at an end thereof selectively carrying baits and lures;

towing the line through the body of water;

withdrawing the line from the water to determine the depth of submersion of the baits and lures by reading of the gauge;

adjusting one or more conditions known to effect the depth of submersion, selected from among a group of conditions including the speed of the vessel and the weight of the baits and lures, and trolling the line, bait and lure, and gauge again through the water;

repeating the trolling, withdrawing, gauge reading and adjusting steps until the desired depth of submersion is indicated by the gauge; wherein the water depth gauge comprises an elongate light transmitting tube, having an opening extending longitudinally therethrough and having one end closed;

valve means allowing water to enter the open end of the tube when the external water pressure exceeds the pressure therewithin, and preventing the escape of air and water therefrom when the internal pressure exceeds the external pressure;

scale means carried by the tube, indicating the depth of submersion in accordance with Boyle's Law;

reset means for releasing the water and pressure contained in the tube; and attachment means for securing the gauge substantially aligned with the fishing line at the lure and bait end thereof.

3. The method of claim 1, wherein:

valve means is a spring-loaded ball check valve, having a ball with a shaft attached thereto and extending to the exterior of the tube, said shaft when pressed forcing the ball away from a seat, releasing the internal water and pressure in the tube.

4. The method of claim 1, wherein:

the check valve means comprises a rubber flapper check valve.

5. The method of claim 2, wherein:

valve means is a spring-loaded ball check valve, having a ball with a shaft attached thereto and extending to the exterior of the tube, said shaft when pressed forcing the ball away from a seat, releasing the internal water and pressure in the tube.

6. The method of claim 2, wherein:

the check valve means comprises a rubber flapper check valve.

* * * * *